April 23, 1963    J. T. GONDEK    3,086,502
TELESCOPING HYDRAULIC CYLINDER
Filed Jan. 6, 1961
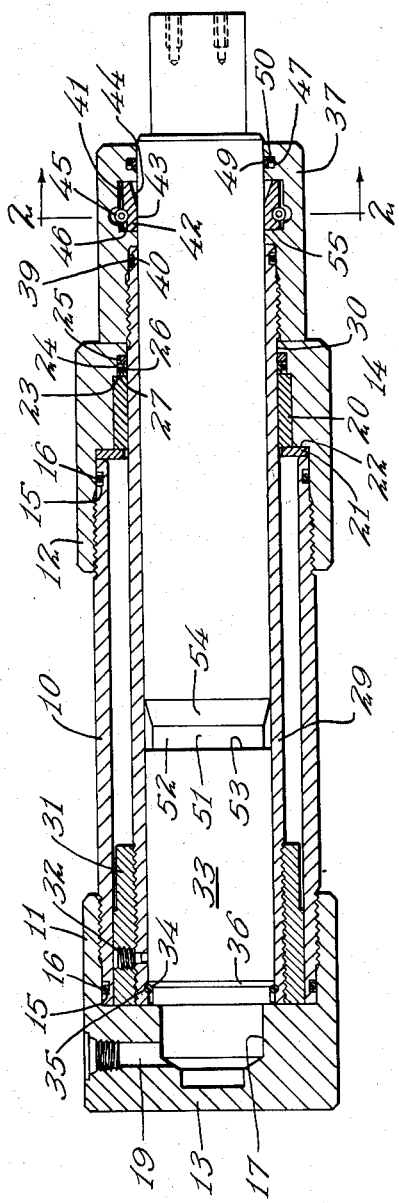
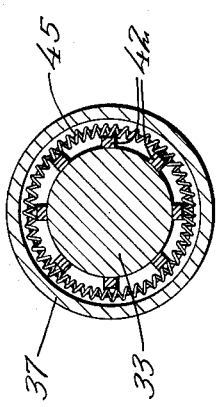
INVENTOR
John T. Gondek
BY Robert M. Dunning
ATTORNEY

United States Patent Office 3,086,502
Patented Apr. 23, 1963

3,086,502
TELESCOPING HYDRAULIC CYLINDER
John T. Gondek, 2206 Roosevelt St. NE.,
Minneapolis, Minn.
Filed Jan. 6, 1961, Ser. No. 81,141
2 Claims. (Cl. 121—46)

This invention relates to an improvement in telescoping hydraulic cylinder and deals particularly with a hydraulic cylinder having a relatively long stroke.

In hydraulic cylinders of a conventional type, the stroke of the piston rod of the cylinder is substantially less than the overall length of the cylinder and piston rod in collapsed position. In some instances it is impractical to employ a hydraulic cylinder of sufficient length to produce the desired length of stroke. In such instances, it has sometimes been found possible to have the piston rod slidably supported within a sleeve, which in turn is slidably supported within an outer cylinder. As a result, when the piston rod reaches the end of its stroke, the piston rod and its encircling sleeve can slide within the cylinder, thus materially increasing the length of stroke without increasing the length of the cylinder in collapsed form. It is with this type of construction that the present invention is particularly involved.

In certain constructions of the type described, it is desirable that the piston and the piston rod be of the same outer diameter rather than to employ the more usual construction of having the piston of larger diameter than the piston rod, so that the question of displacing hydraulic fluid as the piston rod moves is eliminated. One of the difficulties with this type of construction lies in the fact that some means must be provided to limit the movement of the piston rod within the inner sleeve or cylinder. Accordingly, it is the object of the present invention to provide a hydraulic cylinder of the type described in which means are provided on the inner sleeve or cylinder which automatically engage the piston rod after it is moved a predetermined distance so as to prevent further outward movement of the piston rod relative to the sleeve. Accordingly, any further movement of the piston rod from the outer cylinder can only be in combination with the inner sleeve or cylinder.

A feature of the present invention resides in the provision of a piston rod having a peripheral groove spaced from an end thereof and in providing a series of angular jaws which encircle the piston rod and which are anchored relative to the sleeve or inner cylinder. After the piston rod has moved outwardly a predetermined distance, the locking means engages in the groove in the piston rod, thereby causing movement of the sleeve with the piston rod.

A further feature of the present invention lies in the provision of a series of angularly spaced jaws which are supported by the sleeve and which are urged inwardly by a suitable spring means. When the piston rod moves outwardly a predetermined distance, these jaws engage in a peripheral groove in the piston rod and lock the piston rod from further movement relative to the sleeve in one direction. The jaws and the groove are so arranged that upon reverse movement of the piston rod, the jaws may be automatically disengaged from the groove so that the rod may again move relative to the inner cylinder and sleeve.

These and other objects and novel features of the present invention will be more clearly and fully set forth in the following specification and claims.

In the drawings forming a part of the specification:
FIGURE 1 is a longitudinal sectional view through a typical cylinder showing the arrangement of parts therein.
FIGURE 2 is a cross sectional view through the structure of FIGURE 1, the position of section being indicated by the line 2—2 of FIGURE 1.

With reference to the drawings, the device includes a cylindrical sleeve 10 which is externally threaded near opposite ends to accommodate the hollow cylindrical flanges 11 and 12 of end caps 13 and 14 respectively. The flanges 11 and 12 are internally threaded and are secured to opposite ends of the sleeve 10. Peripheral grooves 15 are provided near opposite ends of the sleeve 10, and sealing rings 16 are positioned in the grooves 15 to form a seal between the end caps and the ends of the sleeve.

The end cap 13 is provided with an axial cavity 17 and a radially extending passage 19 permits fluid under pressure to be directed into the cavity. The end cap 12 is provided with a bearing ring 20 held in place by means of a washer 21 engaged between the end of the sleeve 10 and a shoulder 22 which terminates flush with an end of the bearing 20. A second shoulder 23 engages the opposite end of the bearing 20 to hold the bearing ring in place. A seal chamber 24 is provided outwardly of the shoulder 23, and the seal chamber 24 includes a seal ring 25, an inner sealing ring 26, and an outer resilient sealing ring 27 encircling the inner sealing ring 26.

A sleeve or inner cylinder 29 extends through an axial aperture 30 in the end cap 12, and is slidably supported by the bearing 20. A bearing ring 31 is threaded onto the end of the sleeve 29 which is enclosed within the cylinder 10, and is held in proper place by a set screw 32 or other similar means. The bearing ring 31 supports the inner extremity of the cylinder 29 as it slides longitudinally of the cylinder 10 and acts to limit outward movement of the sleeve 29 relative to the outer cylinder 10. An end of the bearing sleeve 31 is engageable against the locking ring 21 to prevent further outward movement of the sleeve.

An elongated piston 33 is slidably supported within the sleeve 29 and projects from the open outer end thereof. A ring 34 is supported in a groove 35 in the inner wall of the sleeve 29 adjoining the inner end of the sleeve, and this ring 34 is engageable against a shoulder 36 on the inner end of the piston 33 to limit inward movement of the piston relative to the sleeve 29. A sleeve 37 is threaded to the end of the sleeve 29 which projects through the end cap 12, and is sealed thereto by a sealing ring 39 which is positioned in a groove 40 near the outer end of the sleeve 29. The sleeve 37 forms an end cap for the inner cylinder or sleeve 29 and is provided with a groove 40 in its inner surface spaced from the outer end of the sleeve. A series of angularly spaced jaws 42 are positioned in the groove 41 about the periphery of the piston 33. The jaws have inner surface portions 43 which lie substantially on a cylindrical plane and which bear against the periphery of the piston 33. The jaws 42 also include outwardly tapered surface portions 44 flairing outwardly toward the outer extremity of the sleeve 37. The jaws 42 are held in assembled relation, and are held in contact with the piston 33 by means of a ring shaped spring 45 which encircles the jaws, and which is seated in grooves 46 in the outer surfaces of the jaws.

A groove 47 is provided in the inner surface of the sleeve 37 between the groove 41 and the outer end of this sleeve. The seal chamber 47 includes an inner sealing ring 49, and a resilient or elastic outer sealing ring 50. The sealing rings provide a seal between the sleeve or end cap 37 and the piston 33.

The piston 33 is provided with a peripheral groove 51 which is spaced from the inner end of the piston properly to limit the outward sliding of the piston 33. The base 52 of the groove 51 is substantially cylindrical, and the end wall 53 of the groove 51 is preferably on a plane normal to the axis of the piston. The opposite wall 54 of the groove is on a frusto conical plane, the angle of this wall 54 being generally the same as the angle of the outwardly flairing ends 44 of the jaws 42. As a result, as the groove 51 moves into registry with the jaws 42, the spring 45 contracts the jaws together, and draws them into the groove 51, the square ends 55 of the jaws 42 engaging against the side wall 53 of the groove 51 to hold the piston 33 from further outward movement relative to the sleeve 29.

It is believed that the operation of the apparatus is in general, obvious from the foregoing description. When fluid under pressure is applied to the inlet 19, and is directed to the cavity 17 in the outer cylinder end cap 13, the piston 33 is moved to the right within the inner sleeve or cylinder 29 until the groove 51 reaches the jaws 42. The spring 45 then contracts the jaws inwardly until the ends 55 of the jaws engage against the side wall 53 of the groove 51. As the jaws 42 are held from any material axial movement by the walls of the grooves 41, further movement of the piston 33 moves the inner sleeve or cylinder 29 in unison therewith. The movement of the inner cylinder 29 may continue until the end of the bearing ring 31 engages against the locking ring 21.

When the piston 33 is moved in a reverse direction, the movement will continue until the shoulder 36 of the piston 33 engages the ring 34. Further movement of the piston 33 in a direction to collapse the piston will move the inner sleeve 29 into the outer cylinder 10 until the inner limit of movement is reached.

As the piston 33 begins its reverse movement, the outwardly flared surfaces 44 of the jaws 42 engage against the inclined wall 54 of the groove 51, and the jaws are cammed outwardly by this engagement as the piston retracts. Thus the jaws have no material effect on the return of the piston to its original position.

In accordance with the patent statutes, I have described the principles of construction and operation of my improvement in telescoping hydraulic cylinder, and while I have endeavored to set forth the best embodiment thereof, I desire to have it understood that changes may be made within the scope of the following claims without departing from the spirit of my invention.

I claim:
1. A locking means for use in a hydraulic device including a cylinder having an open end and a closed end, an open ended sleeve slidable within said cylinder and having an end slidable through the open end of said cylinder within fixed limits, a piston slidable within said sleeve and having a peripheral groove thereabout between its ends, said piston having an end slidable through said one end of said sleeve, said sleeve having an internal circular groove in its inner surface adjacent to said one end thereof, the locking means including angularly spaced jaws in said circular groove encircling said piston and engageable in said peripheral groove to limit movement of said piston through said one end of said sleeve in one direction of travel of said piston relative to said sleeve and to move said sleeve in unison therewith, resilient means encircling said jaws to urge the same against said piston and cooperable means on said jaws and said piston for disengaging said jaws from said peripheral groove when said sleeve is in retracted position within said cylinder.

2. The structure of claim 1 and in which said resilient means comprises a ring-shaped spring.

References Cited in the file of this patent
UNITED STATES PATENTS

| | | |
|---|---|---|
| 1,130,884 | Blakely et al. | Mar. 9, 1915 |
| 1,248,861 | Holloway | Dec. 4, 1917 |
| 1,928,533 | Goss | Sept. 26, 1933 |
| 2,118,890 | Maes | May 31, 1938 |
| 2,221,121 | Wallace | Nov. 12, 1940 |
| 2,787,252 | Papanoli | Apr. 2, 1957 |